United States Patent
Cottis

(10) Patent No.: US 6,833,405 B1
(45) Date of Patent: Dec. 21, 2004

(54) COMPOSITIONS CONTAINING LIQUID CRYSTALLINE POLYMERS

(75) Inventor: Steve Gust Cottis, West Windsor Princeton Junction, NJ (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 09/610,132

(22) Filed: Jul. 5, 2000

Related U.S. Application Data

(63) Continuation-in-part of application No. 09/365,126, filed on Jul. 30, 1999, now abandoned.
(60) Provisional application No. 60/094,913, filed on Jul. 31, 1998.

(51) Int. Cl.$^7$ ............................. C08K 3/20; C08K 9/02
(52) U.S. Cl. ...................... 524/497; 524/84; 524/95; 524/100; 524/104; 524/106; 524/486; 524/601; 524/604; 524/605; 523/205; 523/210
(58) Field of Search ................. 524/80, 84, 95, 524/100, 104, 111, 413, 497, 601, 604–605, 486, 106; 523/205, 210

(56) References Cited

U.S. PATENT DOCUMENTS

| | | | | |
|---|---|---|---|---|
| 4,269,947 A | * | 5/1981 | Inata et al. ................... | 525/10 |
| 4,617,619 A | | 10/1986 | Gehly ......................... | 362/804 |
| 5,141,985 A | * | 8/1992 | Asai et al. ................... | 524/497 |
| 5,268,414 A | * | 12/1993 | Nakai et al. ................. | 524/605 |
| 5,308,913 A | * | 5/1994 | Asai et al. ................... | 524/497 |
| 5,962,122 A | * | 10/1999 | Walpita et al. .............. | 524/413 |
| 6,027,771 A | * | 2/2000 | Moriya ......................... | 428/1 |

FOREIGN PATENT DOCUMENTS

| | | |
|---|---|---|
| EP | 549188 A1 | 6/1993 |
| EP | 824130 A2 | 2/1998 |
| JP | 320483 * | 12/1993 |
| JP | 05320483 A | 12/1993 |

* cited by examiner

*Primary Examiner*—Peter Szekely

(57) ABSTRACT

Excellent tracking index as well as flame-resistant properties are achieved with other desirable characteristics of LCPs in a resin composition consisting essentially of: a) a wholly aromatic polyester which is melt processable and which displays anisotropy in the molten state; b) a non-conductive filler material having a diameter of less than about 3 m, with said non-conductive filler material being present in an amount sufficient to increase the comparative tracking index (CTI) rating of said composition to above 220 volts and render the composition non-burning. Optionally, an extraordinarily small amount of non-volatile fluorescent brightener can be added to the resin composition. In combination with the non-conductive filler, the fluorescent brightener is found to surprisingly and significantly improves the flame-retardant property of the resin. Such compositions are advantageously employed in electrical and electronic apparatuses.

6 Claims, No Drawings

COMPOSITIONS CONTAINING LIQUID CRYSTALLINE POLYMERS

CROSS REFERENCE TO RELATED APPLICATIONS

This is a continuation-in-part of application Ser. No. 09/365,126 filed Jul. 30, 1999, now abandoned which claims benefit of Provisional Application No. 60/094,913 filed Jul. 31, 1998.

FIELD OF THE INVENTION

This invention relates to thermotropic liquid crystalline polymer compositions having a high tracking index and excellent flame-retarding properties.

BACKGROUND OF THE INVENTION

Liquid crystalline polymers (LCPs) have become important items of commerce, being useful as molding resins for general purpose uses, and more specifically in the electrical and electronics industries due to their thermal stability, chemical resistance, and other desirable properties. For many electrical and electronics applications, the molding resins should exhibit good tracking resistance and good flame-retarding properties.

Tracking is a phenomenon associated with the formation of permanent and progressive conducting paths on the surface of materials by the combined effects of an electrical field and external surface pollution. Electrical tracking can occur when a damaged energized electrical part becomes wet, e.g., from electrolytes or condensation. This tracking may lead to flash over and arcing that causes further damage in the electrical part, causing a catastrophic cascade failure. Tracking can occur at low voltages, e.g., 100V AC or less but becomes less likely as the voltage is reduced. The comparative tracking index (CTI) rating provides a quantitative indication of a composition's ability to perform as an electrical insulating material under wet and/or contaminated conditions. In determining the CTI rating of a resin composition, two electrodes are placed on a molded test specimen. A voltage differential is then established between the electrodes while an aqueous ammonium chloride solution is slowly dripped on the test specimen. The CTI rating of the test specimen is the maximum electrode voltage differential at which, in five consecutive tests, more than 50 drops of the solution must be applied to the test specimen in order to cause tracking to occur. Hence, the CTI value is the highest voltage at which a molding is found not to exhibit conductivity. For some applications in the electrical and electronics industry, the CTI value is expected to be at least 220 volts.

Flame-retarding properties are measured according to the Underwriters' Laboratories Bulletin No. 94 test, in which a sample having approximate dimensions of 2.5' by 0.5' by 0.0625' is contacted with a Bunsen burner flame for 10 seconds. The sample is then removed and the amount of time it takes for the flame to be out is recorded. The test also characterizes the material as "dripping" or "non-dripping," since flaming drops of resin which could cause adjacent structures to burn are of concern. A sample is said to "drip" when some molten resin falls off the bar in the test. If the drip is burning, and it burns enough to ignite a cotton ball located beneath the bar, the material fails the test. Even self-extinguishing drips, which technically do not cause the material to fail the test, are considered undesirable in practice. The test is repeated with the same sample placed in contact with a Bunsen burner flame again for 10 seconds. A UL V-0 rating requires a flame-out-time (FOT) of not more than 10 seconds for any one sample in a test of five samples—each repeated twice, and a cumulative FOT of not more than 50 seconds total for the five samples. When the five test samples have a cumulative FOT of 50 seconds and one or more of the five samples fails the 10-second test, than a V-1 rating is granted. A V-1 rating is universally required for electrical applications with V-0 being necessary, although flame retardants having V-1 or V-2 ratings are also suitable for many end uses. However, as a practical matter, a V-0 rating with a maximum cumulative FOT of 35 seconds is often mandated by purchasers.

It is known that halogen-containing compounds, such as decabromodiphenylethane or brominated polystyrene, can be used to prepare flame-retardant thermoplastics. U.S. Pat. No. 4,824,723 discloses a flame resistant electrically insulating multilayer material comprising a core of a thermoplastic polymer and blends and an outer layer comprising blends of the polymers with a halogen-containing flame-retardant, with a V-0 rating and an excellent CTI rating of greater than 500 volts.

U.S. Pat. No. 4,636,544 discloses the use of titanium dioxide (TiO2) to improve the CTI of resin molding compositions. However, a flame retardant is still required in the composition. TiO2 is used in a limited amount, preferably in an amount of about 1 to about 10 parts TiO2 for each 85 parts by weight of resin and halogenated poly(1,4-butylene terephthalate) composition. U.S. Pat. No. 4,421,888 discloses an article molded from a non-burning, non-dripping filled polyester composition having a high level of tracking resistance, comprising a mixture of polyethylene terephthalate and polybutylene terephthalate, a mixture of fiber glass and talc, and an effective amount of a halogen-containing flame-retardant.

The disadvantage of flame-resistant agents, particularly flame-resistant agents based on halogenated hydrocarbons in thermoplastics and particularly in polyesters, is that they cause the electrical properties to deteriorate. Additionally, the use of halogen-containing compounds in thermoplastics is severely restricted in certain countries for the reason that they give off toxic fumes while burning, and the halogenated flame retardants themselves may be toxic. A need presently exists for plastic compositions which possess the thermal stability, chemical resistance, and other desirable characteristics of LCPs as well as excellent flame-resistant property and high CTI rating without the use of halogen-containing compounds as flame-retardants.

SUMMARY OF THE INVENTION

Surprisingly, we have found that good tracking index and flame resistance can be achieved with other desirable characteristics of LCPs in a resin composition without the use of any flame-retardants. The novel composition consists essentially of:

a) a wholly aromatic polyester which is melt processible and which displays anisotropy in the molten state;

b) a non-conductive filler material having a mean particle size of less than about 4 $\mu$m, present in an amount sufficient to increase the comparative tracking index (CTI) rating of said composition to above 220 volts and render the composition non-burning; and optionally c) at least one fluorescent optical brightener in an amount of greater than 0.005 wt. % and having a boiling point of $T_{bp} > T_m - 60°$ C., where $T_m$ is the melting point of the LCP.

The extraordinarily small amount of fluorescent brightener in combination with the non-conductive filler to the LCP resin composition was found to surprisingly and significantly improve the flame-retardant property of the resin. Compositions with and without at least one fluorescent optical brightener are included within the invention.

The invention also relates to a practical method for the production of a resin composition for electrical and electronics application having good tracking index as well as flame-resistant properties by blending a wholly aromatic polyester with a non-conductive filler material having a mean particle size of less than about 4 μm, preferably a chloride-process rutile-type metal-oxides coated titanium dioxide and preferably in an amount of about 30 to 50 weight percent filler material based on total weight of said aromatic polyester and said filler material.

The present invention further relates to electrical devices, by fabricating the electrical devices from a resin composition consisting essentially of: a) a wholly aromatic polyester which is melt processable and which displays anisotropy in the molten state; b) a non-conductive filler material having a mean particle size of less than about 4 μm; and optionally c) at least one fluorescent optical brightener in an amount of greater than 0.005 wt. % and having a boiling point of $T_{bp} > T_m - 60C$, where $T_m$ is the melting point of the LCP.

Also disclosed herein is a electronic or electrical apparatus, comprising a component formed from a liquid crystalline polymer composition consisting essentially of a) a thermotropic liquid crystalline polymer component which is an aromatic polyester, poly(ester-amide), poly(ester-imide), poly(ester-amide-imide), or mixtures thereof; b) at least one non-conductive filling agent component having a longest dimension of less than about 4 μm; and optionally c) at least one fluorescent optical brightener in an amount of greater than 0.005 wt. % and having a boiling point of $T_{bp} > T_m - 60C$, where $T_m$ is the melting point of the LCP; and wherein said electronic or electrical apparatus has a comparative tracking index (CTI) rating above 220 volts and a flammability rating of V-0 in test UL-94 at a 0.0625" thickness, and said apparatus also comprises an electrical conductor carrying a voltage of 200 volts or more.

DETAILED DESCRIPTION OF PREFERRED EMBODIMENTS

The present invention provides a novel composition of thermotropic liquid crystalline polymers. Thermotropic liquid crystalline polymers (LCPs) are known in the art by various terms, including "liquid crystal" and "anisotropic melts." A polymer is optically anisotropic if, in the melt phase, it transmits light when examined between crossed polarizers using a polarizing microscope. By "thermotropic" is meant that the polymer may be melted and then re-solidified, i.e. is thermoplastic.

High CTI/Flame Resistant LCP Compositions:

The LCP polymers useful herein include thermotropic liquid crystalline polyesters and liquid crystalline poly(ester-amides), poly(ester-imide), poly(ester-amide-imide), or mixtures thereof. These terms have their usual meaning, and simply indicate that the repeat units in the polymer are joined by ester and optionally amide and/or imide linkages. Preferred polymers are liquid crystalline polyesters, and it is further preferred that these polyesters be aromatic polyesters. By "aromatic" is meant that, except for the carbon atoms contained in functional groups such as ester, amide or imide, all of the carbon atoms in the main chain of the polymer are present in aromatic rings such as phenylene, naphthylene, biphenylene, etc. Carbon atoms in other types of groupings such as alkyl may be present as substituents on the aromatic rings, as in a repeat unit derived from methylhydroquinone or 2-t-butyl-4-hydroxybenzoic acid, and/or also present at other places in the polymer such as in n-alkyl amides. Other substituent groups such as halogen, ether, and aryl may also be present in the LCP.

As the components of the wholly aromatic polyester used in the LCP compositions of the present invention, there may be used for example: i) hydroquinone; ii) 4,4'-dihydroxybiphenyl(4,4'-biphenol); iii) isophthalic acid; iv) terephthalic acid; v) p-hydroxybenzoic acid or its derivatives; vi) 4,4'-dihydroxybiphenyl (4,4'-bibenzoic acid) or its derivatives; viii) 2,6-naphthalenedicarboxylic acid; iv) 6-hydroxy-2-naphthoic acid, or combinations thereof. These components are all known in the art and are commercially available or can be prepared by techniques readily available to those in the art. Of the combinations of these components, a combination of hydroquinone, 4,4'-dihydroxybiphenyl, terephthalic acid, 4-hydroxybenzoic acid, and 2,6-naphthalenedicarboxylic acid, is particularly preferred.

LCP compositions are known to have exceptionally high tensile strength and modulus compared to analogous polymers not having a liquid crystalline character. Applicants have found that an addition of about 30 to 50 percent by weight of a non-conductive filler having a mean particle size of less than 4 μm to the wholly aromatic polyester surprisingly improves the tracking index and flame-resistant properties of the compositions for meeting material specifications required for electrical apparatuses such as circuit breakers, relays, connectors, etc., without the need for a flame-retardant component commonly required in the prior art. The precise nature of the operation of the non-conductive filler is unknown in improving both the tracking index and flame-resistant properties of the LCP resin. It is believed that the high concentration of non-conductive particles in the resin and especially at the surface, leads to the formation of insulated regions which hinder the formation of the carbonaceous conducting deposits during the tracking process. However, this is not meant to be a limitation or requirement of the present invention.

Examples of non-conductive powdery fillers include, but not limited to: diatomaceous earth and wollastonite; metal oxides such as iron oxides, titanium oxides, barium oxides, zinc oxides and alumina; metal carbonates such as calcium carbonate and magnesium carbonate; metal sulfates such as calcium sulfate and barium sulfate; phosphates of aluminum, calcium, magnesium, zinc, cerium and mixed metals; titanates of magnesium, calcium, aluminum and mixed metals; fluorides of magnesium and calcium; silicates of zinc, zirconium, calcium, barium, magnesium, mixed alkaline earths and naturally occurring silicate minerals and the like; aluminosilicates of alkali and alkaline earths, and naturally occurring aluminosilicates and the like; oxalates of calcium, zinc, magnesium, aluminum and mixed metals; aluminates of zinc, calcium, magnesium, and mixed alkaline earth silicon carbide; silicon nitride; and boron nitride. A conductive powdery filler such as carbon black will negatively affect the tracking index of the LCP composition.

Preferred non-conductive fillers for use in the LCP composition of the present invention include titanium dioxide and modified titanium dioxide pigments. Titanium dioxide generally finds wide application as a white pigment having a large hiding power. The surfaces of the titanium oxide particles may be untreated, or may be coated with an oxide of a metal such as aluminum, silicon or zirconia giving them a coating with high surface area, or may be treated with an organic acid such as stearic acid or lauric acid or an organosiloxane oil. Useful crystal forms of titanium dioxide include anatase and rutile. The former is semistable and changes to the stable rutile form at high temperature. The rutile form is preferred. The titanium dioxide particulates may take any discrete form such as particles, flakes, and the like. A preferred non-conductive filler is a rutile-type high solids metal oxides coated titanium dioxide, such as a chloride process rutile type titanium dioxide. A most preferred non-conductive filler is a titanium dioxide pigment with 97% TiO2 and with surface treated with alumina and an organic substance.

One important aspect of the invention is the size of the non-conductive filler. It is desirable that the filler particulates be of a size of less than 4 µm, and preferably less than 1 µm, and most preferably in the range of 0.10 to 0.30 µm. Aggregates or agglomerates of non-conductive filler particulates are also useful as long as the average diameter of the aggregate or agglomerate is within the above prescribed size range of the non-conductive filler particles. Aggregates are distinguished from agglomerates in that aggregates are held together by strong bonds such as fusion bonds and cannot be fragmented easily, while agglomerates are weakly bonded and can be broken up by high energy agitation.

The amount of non-conductive filler present in the LCP compositions of the present invention is defined as a level sufficient to achieve a UL94 flammability rating of V-0 at 0.0625' while maintaining a CTI exceeding 220 volts. Typically, the level of the non-conductive filler may range from about 30 to about 50 percent by weight of the total weight of the resin.

High CTI/Flame-resistant LCP Compositions with Optional Brightness Enhancing Agent It was surprisingly found that when a brightening agent was added to the electrically insulating composition, there was noticeable improvement in the flame-retardant properties of the material. The boiling point of the brightening agent should preferably be as follows: $T_{bp} > T_m - 60°$ C., where $T_{bp}$ is the boiling point of the brightening agent and $T_m$ is the melting point of the LCP.

Brightness enhancing agents are also commonly known as fluorescent optical brighteners. They include, but are not particularly limited to, 2,2'-(thiophendiyl)-bis-(t-butyl benzoxazole); 2-(stibyl-4')-(naphtho-1',2',4,5)-1,2,3-triazole-2'-sulfonic acid phenyl ester; and 7-(4'-chloro-6'-diethylamino-1',3',5'-triazine-4'-yl)amino-3-phenyl coumarin. Other fluorescent optical brighteners which have one or more moieties derived from substituted anthracene, stilbene, triazine, thiazole, benzoxazole, coumarin, xanthene, triazole, oxazole, thiophene or pyrazoline may be utilized in the LCP compositions of the present invention.

Examples of suitable optical brighteners which can be used in accordance with this invention are Uvitex® OB from the Ciba-Geigy Chemical Company, Ardsley, N.Y. Uvitex® OB is thought to be 2,5-Bis(5-tert-butyl-2-benzoxazoly) thiopene having bis(alkyl-substituted benzoxazolyl) thiophene structure; Leucopure® EGM from Sandoz, East Hanover, N.J. Leucopure. Leucopure® EGM is thought to be 7-(2h-naphthol(1,2-d)triazol-2yl)3phenyl-coumarin; Phorwhite® K-20G2 from Mobay Chemical Corporation, Union, N.J. and is thought to be a pyrazoline derivative; Eastobrite® OB-1 from Eastman Chemical Products, Inc. Kingsport, Tenn., which is thought to be 4,4-Bis (benzoxazoyl)stilbene. The above-mentioned Uvitex® OB is most preferred for use in accordance with this invention.

A concentration of greater than about 0.005 weight percent, and preferably from about 0.005 to about 0.3 weight percent of a high-boiling brightness enhancing agent, or fluorescent brightener, was used in the high CTI flame-resistant LCP composition of the present invention. Surprisingly, this extraordinarily small amount of fluorescent brightener when used in combination with the non-conductive filler, not only substantially enhances the appearance of the material, but also improves the flame resistance of the composition in general by lowering its burn time. Consequently, the addition of the fluorescent brightener allows more non-conductive fillers to be used. The fluorescent brighteners extends the range of non-conductive filler in the LCP compositions of the present invention from about 43 to above 45 weight percent.

The compositions of the invention may also optionally contain various well-known additives that are non-conductive in amounts which do not affect the flame-retardant and electrical insulating properties of the resins. Such additives include UV stabilizers, lubricants, and colorants such as anthraquinone, direct dyes, para red, and the like.

Preparation of the High CTI Flame-Resistant LCP Compositions

The initial LCP compositions of the present invention may be prepared from the appropriate monomers, or precursors thereof, by standard polycondensation techniques (which can include either melt, solution, and/or solid phase polymerization), preferably under anhydrous conditions and in an inert atmosphere. For example, the requisite amounts of acetic anhydride, the diols, the hydroxybenzoic acid (or optionally the acetate/diacetate derivatives of the diols/hydroxybenzoic acid), and the diacids, and optionally up to 20 percent excess acetic anhydride, are combined in a reaction vessel equipped with a stirrer, nitrogen inlet tube, and combination distillation head/condenser (to facilitate by-product removal).

The reaction vessel and other equipment are dried and purged with nitrogen prior to use. The vessel and stirred contents, maintained under nitrogen, are heated during which time the ingredients react and any by-product formed (such as, for example, acetic acid) is removed via the distillation head/condenser and is collected. When the polymerization appears nearly complete, as indicated by the amount of by-product collected remaining constant, the molten mass is placed under reduced pressure (e.g. 10 mm of Hg(abs) or less) and is heated to a higher temperature, to facilitate removal of any remaining by-product and to complete the polymerization. Polymerization conditions may be varied according to, e.g., the reactants employed and the degree of polymerization desired.

The LCP melt may then be removed, cooled, and allowed to solidify prior to purification and/or subsequent processing such as melt compounding the liquid crystalline polyester composition with the non-conductive filler and optionally, the brightness enhancing agent of the present invention. Melt compounding can be accomplished by any device capable of mixing the molten liquid crystalline polyester and filler compositions, such as an extruder, either single or twin screw. It is critical that the components are thoroughly blended together at an effective temperature at which the ingredients flux sufficiently for a uniform and maximum dispersion of the non-conductive particulates in the LCP melt. Twin screw extruders may be either co-rotating or counter-rotating. The compounded compositions may be cut into pellets for melt fabrication into a wide variety of articles by conventional processes such as extrusion and injection molding into such forms molded articles and films.

Optionally, the molten polymer along with the nonconductive filler and the elective brightness enhancing agent, may be transferred directly to an appropriate apparatus such as a melt extruder and/or injection molding machine or spinning unit, for the preparation of articles, such as molded and/or shaped electrical apparatuses. Again, the components should be thoroughly blended for maximum dispersions of the particulates.

The high CTI/flame-resistant LCP compositions described herein are useful in an electrical apparatus (which also includes an "electronic" apparatus) in which electrical conductors carrying relatively high voltages are present in or part of the apparatus. By high voltages herein is meant greater than about 200 volts, more preferably about 220 volts or more, especially preferably about 240 volts or more, and very preferably about 250 volts or more. Preferably at least one of the conductors may carry a current of at least 0.5 amp, more preferably at least 1 amp. In a sense one could say the apparatus is exposed to voltages of a certain minimum level. These voltages may also be the "ratings" of the electrical apparatus. By this is meant that the electrical apparatus is rated by an appropriate rating organization (for example Underwriter's Laboratories) to carry (be exposed) to an electrical current at a certain maximum voltage. The high CTI/flame-resistant LCP compositions described herein may function as suitable insulators in such an electrical apparatus at these higher voltages because of their high CTI ratings, that is they do not lose their insulating properties (over time) when exposed to such voltages. In addition it is required that many if not most of the equipment which is used to conduct or handle electricity have a certain minimum level of flame or burning resistance, and the compositions described herein have this required property.

EXAMPLES

Tests

Melt viscosities of dried samples were determined using a Galaxy Ò V, Model 8052 capillary rheometer made by Kayeness, Inc. The measurements were made at 350° C. or 360° C. at a shear rate of 1000 l/sec and with a die having an orifice of 30/1000 inch and a L/D of 20.

Flammability tests were performed according to UL-94.

The following physical tests described herein were carried out according to procedures established by the American Society for Testing and Materials (ASTM), including:

Flexural Modulus and Flexural Strength—ASTM D-790.
Elongation to break strain gauges—ASTM D-638.
Notched Izod—ASTM D-256.
DTUL (Heat Deflection Temperature)—ASTM D-648.

Comparative Tracking Index (CTI) test was in accordance to ASTM UL 746A to determine a specimen's ability to perform as an insulating material under wet and contaminated conditions, as volts of electricity which may be applied before tracking takes place in the polymer sample. The maximum voltage that can be measured in a CTI test is 600 volts.

Preparations

Unless otherwise specified, compounding of LCP compositions in the Examples below with the non-conductive filler and optionally in some examples, the brightening agent, was done in a 30 or 40 mm ZSK Werner and Pfleiderer twin-screw extruder having a zone with conventional conveying elements, a zone with kneading or mixing elements, and a low pressure zone with venting under vacuum of any volatiles from the polymer melt, and a die.

In examples utilizing the brightening agent and the 40MM ZSK, the agent was first mixed with about ⅛ to ⅓ of the required non-conductive filler and this concentrate was introduced to the rear zone of the extruder. The rest of the non-conductive filler (without brightening agent) was added from a different feeder to the rear zone. The LCP pellets were added from a third feeder to the rear zone. In examples utilizing the 30MM ZSK, only two feeders were used, one for pellets and the other for the fine powdered ingredients. As the compounded compositions exited the die, they were quenched with a water spray and cut into pellets with a conventional strand cutter. The extruder barrel and die temperatures were maintained at about 340° C. Prior to molding the pellets, the pellets were dried overnight for approximately 16 hours in a vacuum oven with $N_2$ purge at 100–130° C.

The dried polymer pellets were molded into standard test specimens, ¹⁄₁₆' T-bars, ⅛' T-bars or 2' diameter×⅛' discs, using a 6 oz HPM molding machine with barrel temperatures of about 340° C. and injection pressures of about 4000 psi. Unless indicated otherwise, the samples were injection molded at a high injection speed and a medium boost pressures of between 7000–12000 psi. In the examples denoted as "HIGH SPEED," the injection molding was done at a high speed (>0.5-sec.) with a low boost pressures of 7000–10000 psi. In the samples denoted as "LO SPEED," the molding was done at a low speed of >0.5 sec., but with a high boost pressure of >10000 psi. to facilitate the filling of the mold.

Components:

The compositions of LCP resins, the non-conductive filler, the brightening agent, and other fillers used in the examples are as follows:

A: This LCP polymer has the same composition as that of Example 4 of U.S. Pat. No. 5,110,896 of hydroquinone/4,4'-biphenol/terephthlatic acid/2,6-naphthalenedicarboxylic acid/4-hydroxybenzoic acid in molar ratio 50/50/70/30/320.

B: A LCP polymer with the same composition as that of Example 9 of U.S. Pat. No. 5,110,896, comprising hydroquinone/4,4'-biphenol/terephthalic acid/2,6-naphthalenedicarboxylic acid/4-hydroxybenzoic acid in molar ratio 50/50/85/15/320.

C: A LCP polymer comprising of hydroquinone/terephthalic acid/isophthalic acid/2,6-naphthalenedicarboxylic acid/4-hydroxybenzoic acid in molar ratio 100/33/34/33/300.

Unless indicated otherwise, the non-conductive filler is a chloride process rutile type titanium dioxide available from SMC Corp. of Baltimore, Md. as Tiona® RCL-4, with 97% $TiO_2$ and with surface treated with alumina and an organic substance.

In some of the examples, the following non-conductive filler materials were used: a titanium dioxide pigment from SMC Corp. as Tiona® RCL-2 with 90% $TiO_2$ and with surface treated with Al/Si and an organic substance; titanium dioxide pigment Tiona® RCL3 80% $TiO_2$ and with surface treated with Al/Si; a titanium dioxide pigment TIPURE R102 from E. I. du Pont de Nemours and Company of Wilmington, Del. The brightening agent is from Ciba-Geigy Chemical Company, Ardsley, N.Y. as Uvitex® OB, which is a fine, yellow crystalline powder with a melting point of about 196–230° C. The material vaporizes starting at about 300° C.

Talc known under the trade name Jetfil 575C is obtained commercially from Luzenac America, Inc., Englewood, Colo.

The glass filler is chopped E-glass fiber from Owens-Corning Fiberglas Technology Inc., Summit, Ill., as OC 408BC.

It should be noted that the compounding conditions and the screw design affect the properties of the molded parts. Samples were prepared from the same composition and compounded using different screw designs. The properties of the samples, including burn time and CTI rating, were found to vary depending on the screw design with a large screw design being preferred for optimum blending to assure that the components are thoroughly blended.

The injection molding conditions were also found to affect the properties. Samples were prepared from the same compounded material and injection molded under high filling rate and low boost pressure, and then low feeding rate and high boost pressure. The properties including UL 94 rating and CTI were found to vary depending on the feeding method. Injection feeding speed is time in seconds to move the screw ram forward. Typically for the 6 OZ HPM used, a fast speed is less than 0.5 sec (primarily in the range of 0.1–0.2 sec) residence time, and a slow speed is greater than 0.5 sec. A high feeding rate is preferred to give a low residence time in the injection molding machine for optimum molding.

Under the compounding and injection molding conditions tested, it was found that a titanium dioxide pigment available from SMC Corp. as Tiona® RCL-4, with 97% TiO2 and surface treated with alumina and an organic substance to be best. It was also found that certain LCP starting materials were better than others under certain conditions.

Results are shown in Table 1.

TABLE 1

| Example | Compare Molding | Compare Molding | Comp LCP | Comp Screw | Comp LCP Screw | Comp TiO2 | Comp TiO2 | Comp TiO2 |
| --- | --- | --- | --- | --- | --- | --- | --- | --- |
| Screw design | 30 mm | 30 mm | 30 mm | 40 mm | 30 mm | 30 mm | 30 mm | 30 mm |
| Molding Cond. | hi speed | lo speed | — | — | — | — | — | — |
| LCP wt. % - type | 60 "B" | 60 "B" | 60 "B" | 60 "A" | 60 "A" | 60 "A" | 60 "A" | 60 "A" |
| TiO2 - wt. % | 40 RCL4 | 40 RCL4 | 40 RCL4 | 40 RCL4 | 40 RCL4 | 40 RCL3 | 40 RCL2 | 40 R102 |
| Talc wt % | 0 | 0 | 0 | 0 | 0 | 0 | 0 | 0 |
| Glass filler wt % | 0 | 0 | 0 | 0 | 0 | 0 | 0 | 0 |
| Melt visc. (Pa · sec) | 158 | 158 | 158 | 38 | 51 | 19 | 22 | |
| Tensile Strength (psi) | 21180 | 23190 | 21180 | 18740 | 21010 | 12620 | 14260 | 21350 |
| Elongation at Break (%) | 1.52 | 1.55 | 1.52 | 3.18 | 2.54 | 1.84 | 1.734 | 1.305 |
| Flexural Strength (psi) | 23710 | 23600 | 23710 | 19220 | 21410 | 15600 | 17740 | 23310 |
| Flexural Modulus (psi) | 1907000 | 2087000 | 1907000 | 1213000 | 1475000 | 1186000 | 1369000 | 2083000 |
| Notched Izod ft-lbs | 3.38 | — | 3.38 | 6.42 | 66.95 | 1.01 | 1.30 | 4.33 |
| DTUL (° C.) | 275 | 277 | 275 | 241 | 244 | 211 | 227 | 269 |
| UL94 aging 48 hrs./25° C. | 62.6 V1 | 124 V-1 | 62.6 V1 | 34.3 V-0 | 224 V-1 | 37.4 V-0 | 70.7 V-1 | 102 V-1 |
| UL94 - aging 7 days/70° C. | 44.8 V-0 | 81.1 V-1 | 44.8 V-0 | 33.5 V-0 | 128 V-1 | 46.7 V-1 | 45.6 V-0 | 47.7 V-0 |
| CTI (volts) - Disc or Bar | 275 | 275 | 275 | 275 | 225 | 250 | 250 | 250 |

Additional tests were conducted using RCL-4 as the non-conductive filler material. The test results in Table 2 shows that the mere presence of filler material in the compositions provides a resin that has a high track index performance and flame-retardant property as well as excellent mechanical properties.

TABLE 2

| Example | Control 1 | 1 | 2 | 3 | 4 | 5 | 7 | Control 8 |
| --- | --- | --- | --- | --- | --- | --- | --- | --- |
| LCP wt. % - type | 50 "B" | 70 "A" | 67.5 "A" | 65 "A" | 60 "A" | 60 "C" | 60 "B" | 55 "B" |
| RCL4 wt. % | 25 | 30 | 32.5 | 35 | 40 | 40 | 40 | 45 |
| Talc wt % | 15 | 0 | 0 | 0 | 0 | 0 | 0 | 0 |
| Glass filler wt % | 10 | 0 | 0 | 0 | 0 | 0 | 0 | 0 |
| Melt visc. (Pa · sec) | 154 | 38 | 41 | 34.5 | 38.8 | 38.8 | 109 | 132 |
| Tensile Strength (psi) | 19470 | 19090 | 19960 | 21360 | 18740 | 20000 | 23540 | 21350 |
| Elongation at Break (%) | 1.80 | 1.85 | 1.72 | 3.36 | 3.18 | 1.24 | 1.6 | 1.305 |

TABLE 2-continued

| Example | Control 1 | 1 | 2 | 3 | 4 | 5 | 7 | Control 8 |
|---|---|---|---|---|---|---|---|---|
| Flexural Strength (psi) | 23010 | 20520 | 20910 | 20930 | 19220 | 24180 | 22780 | 23310 |
| Flexural Modulus (psi) | 2037000 | 1392000 | 1449000 | 1324000 | 1213000 | 1888000 | 1979000 | 2083000 |
| Notched Izod ft-lbs | 1.17 | 7.52 | 7.54 | 9.95 | 6.42 | 5.02 | 3.01 | 4.33 |
| DTUL (° C.) | 290 | 245 | 242 | 242 | 241 | 223 | 275 | 269 |
| UL94 aging 48 hrs./25° C. | 110 V-1 | 26.7 V-0 | 30.6 V-0 | 25.7 V-0 | 34.3 V-0 | 38 V-0 | 23.3 V-0 | 102 V-1 |
| UL94 - aging 7 days/70° C. | 135 V-0 | 26.7 V-0 | 27.7 V-0 | 31.2 V-0 | 33.5 V-0 | 40.7 V-0 | 45.0 V-0 | 47.7 V-0 |
| CTI (volts) - Disc or Bar | 250 | 225 | 250 | 250 | 300 | 250 | 250 | 250 |

As shown in the following Table 3, the presence of a very small amount of a brightening agent such as Uvitex OB substantially and unexpectedly improves the composition's comparative tracking index and flame-resistance performance.

TABLE 3

| Example | Control 1 | 6 | 7 | Control 8 | 9 | 10 | 11 | 12 |
|---|---|---|---|---|---|---|---|---|
| LCP wt. % - type | 50 "B" | 50 "B" | 60 "B" | 55 "B" | 55 "B" | 55 "B" | 55 "B" | 55 "B" |
| RCL4 wt. % | 25 | 25 | 40 | 45 | 45 | 45 | 45 | 45 |
| Talc wt % | 15 | 15 | 0 | 0 | 0 | 0 | 0 | 0 |
| Uvitex OB wt % | 0 | 0.01 | 0 | 0 | 0.01 | 0.02 | 0.03 | 0.06 |
| Glass filler wt % | 10 | 10 | 0 | 0 | 0 | 0 | 0 | 0 |
| Melt visc. (Pa · sec) | 154 | 63 | 109 | 132 | 124 | 64 | 77 | 80 |
| Tensile Strength (psi) | 19470 | 15100 | 23540 | 21350 | 21280 | 22390 | 21860 | 19465 |
| Elongation at Break (%) | 1.80 | 1.40 | 1.6 | 1.305 | 1.26 | 1.29 | 1.4 | 1.12 |
| Flex. strength - psi | 23010 | 20760 | 22780 | 23310 | 21280 | 23740 | 23570 | 23650 |
| Flex. modulus - psi | 2037000 | 1909000 | 1979000 | 2083000 | 2161000 | 2140000 | 2123000 | 2418000 |
| Notched Izod Ft-lbs | 1.17 | 0.80 | 3.01 | 4.33 | 3.78 | 5.66 | 5.82 | 1.99 |
| DTUL (° C.) | 290 | — | 275 | 269 | 270 | 265 | 264 | — |
| UL94 aging 48 hrs./25° C. | 110 V-0 | 38.6 V-0 | 23.3 V-0 | 102 V-1 | 52.9 V-0 | 51.6 V-0 | 43.4 V-0 | — |
| UL94 - aging 7 days/70° C. | 135 V-0 | 44 V-0 | 45 V-0 | 47.7 V-0 | 44.4 V-0 | 41.7 V-0 | 24.6 V-0 | 27 V-0 |
| CTI (volts) - Disc or Bar | 250 | — | 250 | 250 | 225 | 275 | 250 | — |

As is apparent from the foregoing description, the materials prepared and procedures followed relate only to specific embodiments of the broad invention. While forms of the invention have been illustrated and described, modifications can be made without departing from the spirit and scope of the invention. Accordingly, it is not intended that the invention be limited thereby.

What is claimed is:

1. An electronic or electrical apparatus, comprising:
 a component formed from a liquid crystalline polymer composition consisting essentially of:
  a) a thermotropic liquid crystalline polymer component which is an aromatic polyester, poly(ester-amide), poly(ester-imide), poly(ester-amide-imide), or mixtures thereof, and
  b) 30 to 50 weight percent, based on the weight of the sum of a and b, of rutile titanium dioxide particles having a longest dimension of less than about 4 μm; and
 an electrical conductor carrying a voltage of 200 volts or more.

2. The electronic or electrical apparatus of claim 1, wherein said liquid crystalline polymer (LCP) composition further comprises at least one fluorescent optical brightener:
 having a boiling point of $T_{bp} > T_m - 60C$, where $T_m$ is the melting point of the LCP; having one or more moieties derived from substituted anthracene, stilbene, triazine, thiazole, benzoxazole, coumarin, xanthene, triazole, oxazole, thiophene or pyrazoline; and
 in an amount of greater than 0.005 wt. % based on the total weight percents of a) and b).

3. The electronic or electrical apparatus of claim 1 wherein said titanium dioxide particles have a diameter of about 0.1 to 0.3 μm.

4. The electronic or electrical apparatus of claim 1, wherein said thermotropic liquid crystalline polymer is a wholly aromatic polyester comprises repeating units derived from the group consisting of: i) hydroquinone; ii) 4,4'-dihydroxybiphenyl (4,4'-biphenol); iii) isophthalic acid; iv) terephthalic acid; v) p-hydroxybenzoic; vi) 4,4'-dicarboxybiphenyl (4,4'bibenzoic acid); viii) 2,6-naphthalenedicarboxylic acid; iv) 6-hydroxy-2-naphthoic acid, or combinations thereof.

5. The electronic or electrical apparatus of claim 1, wherein said voltage is about 250 volts or more.

6. The electronic or electrical apparatus of claim 1 wherein said titanium particles are coated with a metal oxide.

* * * * *